(12) United States Patent
Jöckel et al.

(10) Patent No.: US 9,780,811 B2
(45) Date of Patent: Oct. 3, 2017

(54) METHOD FOR SYNCHRONIZING SENSORS

(75) Inventors: Wolfgang Jöckel, Gersfeld (DE);
Otmar Simon, Pohlheim/Holzheim (DE)

(73) Assignee: Continental Teves AG & Co. oHG (DE)

( * ) Notice: Subject to any disclaimer, the term of this patent is extended or adjusted under 35 U.S.C. 154(b) by 1295 days.

(21) Appl. No.: 13/703,979

(22) PCT Filed: Jun. 15, 2011

(86) PCT No.: PCT/EP2011/059925
§ 371 (c)(1),
(2), (4) Date: Feb. 11, 2013

(87) PCT Pub. No.: WO2011/157744
PCT Pub. Date: Dec. 22, 2011

(65) Prior Publication Data
US 2013/0173200 A1    Jul. 4, 2013

(30) Foreign Application Priority Data
Jun. 15, 2010 (DE) .......................... 10 2010 030 132

(51) Int. Cl.
*G01R 19/14* (2006.01)
*H04B 1/04* (2006.01)
(Continued)

(52) U.S. Cl.
CPC ............... *H04B 1/04* (2013.01); *G01D 21/00* (2013.01); *H04B 14/02* (2013.01); *H04Q 9/04* (2013.01)

(58) Field of Classification Search
CPC .......... B60N 2/0232; B60N 2002/0272; B60N 2002/0268; B60N 2/0244; B60N 2/0252; (Continued)

(56) References Cited

U.S. PATENT DOCUMENTS

| 4,511,896 A | 4/1985 | Cousins, III |
| 5,087,838 A | 2/1992 | Fayfield |

(Continued)

FOREIGN PATENT DOCUMENTS

| DE | 196 53 291 | 4/1998 |
| DE | 196 50 935 | 6/1998 |

(Continued)

OTHER PUBLICATIONS

Chinese Office Action for Chinese Application No. 201180029749.3 mailed Nov. 17, 2014.
(Continued)

*Primary Examiner* — Vinh Nguyen
(74) *Attorney, Agent, or Firm* — RatnerPrestia

(57) ABSTRACT

The invention relates to a method for synchronizing sensors in a sensor array, including at least one electronic control unit and at least one sensor, which are connected to each other by a first and a second line, wherein the sensor is supplied with electric power by the first and second lines, and additionally at least one data signal (a) is transmitted by the first and second lines from the sensor to the electronic control unit, wherein the electronic control unit transmits a defined supply voltage signal having varying polarity as a synchronization signal (b, c) to the sensor, whereupon the sensor transmits at least one data signal (a) to the electronic control unit, after the polarity of the synchronization signal has been reversed.

14 Claims, 4 Drawing Sheets

(51) Int. Cl.
*G01D 21/00* (2006.01)
*H04Q 9/04* (2006.01)
*H04B 14/02* (2006.01)

(58) Field of Classification Search
CPC .... B60N 2/067; B60N 2/4829; B60N 2/4852;
B60N 2002/0268; B60N 2/4829; B60R
21/01516; B60R 21/0152; B60R
21/01536; B60R 2021/0004; B60R
2021/23107; B60R 21/232; B60R
21/01552; B60R 2001/1223; B60R
2021/01184; B60R 2022/288; B60R
2022/4685; B60R 2022/4825; B60R
21/01558; B60R 21/33; B60R
2021/01302; B60R 21/0152; B60R
2001/1223; B60R 2022/4685; B60R
21/33; B60R 2022/288; G06K 9/00832;
G06K 9/00624; G06K 19/0717; G01M
17/00; G01M 15/08; G05B 19/00; G05B
19/4097; G05B 19/00; H03K 7/08; G01N
27/4175; G01R 31/007; G01R 31/088;
H04B 14/02; H04B 1/04; H04L 25/4902;
H04L 67/12
See application file for complete search history.

(56) References Cited

U.S. PATENT DOCUMENTS

| | | | |
|---|---|---|---|
| 6,163,723 A | 12/2000 | Roberts et al. | |
| 6,429,786 B1 | 8/2002 | Bansemir et al. | |
| 6,560,279 B1 | 5/2003 | Renz | |
| 6,687,644 B1 | 2/2004 | Zinke et al. | |
| 8,151,098 B2 | 4/2012 | Niwa et al. | |
| 8,330,528 B2 * | 12/2012 | Eckrich | G01D 5/24452 324/609 |
| 2004/0230347 A1 * | 11/2004 | Sakurai | F02D 37/02 701/1 |
| 2004/0249544 A1 * | 12/2004 | Lohberg | G01P 3/489 701/70 |
| 2009/0251831 A1 * | 10/2009 | Shiba | B60L 3/003 361/30 |
| 2010/0036555 A1 * | 2/2010 | Hosoda | B60L 3/003 701/22 |
| 2010/0277224 A1 | 11/2010 | Jöckel et al. | |

FOREIGN PATENT DOCUMENTS

| | | |
|---|---|---|
| DE | 102 03 483 | 11/2002 |
| DE | 69923 989 | 4/2006 |
| DE | 10 2007 026 786 | 4/2008 |
| DE | 10 2009 006 770 | 8/2009 |
| JP | H07283765 A | 10/1995 |
| WO | WO2011/057744 A1 | 5/2011 |

OTHER PUBLICATIONS

International Search Report corresponding to International Application No. PCT/EP2011/059925, dated Oct. 14, 2011.
German Search Report corresponding to application No. DE 10 2011 077 549.8, dated Mar. 15, 2012.
JP Office Action for Japanese Patent Application 2013-514698 (PCT/EP2011/059925) mailed on Jun. 18, 2014.

* cited by examiner

# METHOD FOR SYNCHRONIZING SENSORS

CROSS REFERENCE TO RELATED APPLICATIONS

This application is the U.S. National Phase Application of PCT International Application No. PCT/EP2011/059925, filed Jun. 15, 2011, which claims priority to German Patent Application No. 10 2010 030 132.9, filed Jun. 15, 2010, the contents of such applications being incorporated by reference herein.

FIELD OF THE INVENTION

The invention relates to a method for synchronizing sensors according to the arrangement comprising at least one electronic control unit and at least one sensor which are connected to one another via a first line and a second line, the sensor being supplied with electrical energy via the first and second lines and at least one data signal (a) additionally being transmitted from the sensor to the electronic control unit via the first and second lines, to a sensor arrangement comprising at least one electronic control unit and at least one sensor which are connected to one another via a first line and a second line, the sensor being supplied with electrical energy via the first and second lines and at least one data signal (a) additionally being transmitted from the sensor to the electronic control unit via the first and second lines, and to the use of the sensor arrangement in motor vehicles.

BACKGROUND OF THE INVENTION

The networking of sensors in a motor vehicle often requires the relatively precise temporal association of the recording of measured values and the output of measured values so that the measured values from different sensors can be related in terms of time. A known method involves deliberately stimulating the sensors to record measured values by means of a trigger signal and then reading the data in a synchronized manner. The synchronization is usually effected using chip select signals, data words, a digital synchronization signal or simple voltage pulses.

In all uses in a vehicle, the requirements are focused on the robustness and interference immunity of the signals. In this case, there are significant differences if the sensors are combined on a printed circuit board or if sensors distributed in the vehicle, so-called satellites, are involved. In the case of a large number of satellites, in particular in the airbag region, the transmission of the data via a two-wire current interface has been successful. In this case, the supply lines of the sensor are often used both to supply voltage and to transmit data in a bidirectional manner.

SUMMARY OF THE INVENTION

An aspect of the invention is a method for synchronizing sensors and a sensor arrangement which makes it possible to synchronize the data transmission at least from a sensor to an electronic control unit in a relatively precise manner, in which case the sensor arrangement is or may be relatively cost-effective.

This aspect is achieved, according to the invention, by the method comprising at least one electronic control unit and at least one sensor which are connected to one another via a first line and a second line, the sensor being supplied with electrical energy via the first and second lines and at least one data signal (a) additionally being transmitted from the sensor to the electronic control unit via the first and second lines, wherein the electronic control unit transmits a defined supply voltage signal with alternating polarity to the sensor as the synchronization signal (b, c), whereupon the sensor transmits at least one data signal (a) to the electronic control unit after the polarity of the synchronization signal has been changed and by the sensor arrangement comprising at least one electronic control unit and at least one sensor which are connected to one another via a first line and a second line, the sensor being supplied with electrical energy via the first and second lines and at least one data signal (a) additionally being transmitted from the sensor to the electronic control unit via the first and second lines, wherein the electronic control unit and the sensor are designed in such a manner that they can carry out the method for synchronizing sensors in a sensor arrangement comprising at least one electronic control unit and at least one sensor which are connected to one another via a first line and a second line, the sensor being supplied with electrical energy via the first and second lines and at least one data signal (a) additionally being transmitted from the sensor to the electronic control unit via the first and second lines, wherein the electronic control unit transmits a defined supply voltage signal with alternating polarity to the sensor as the synchronization signal (b, c), whereupon the sensor transmits at least one data signal (a) to the electronic control unit after the polarity of the synchronization signal has been changed.

The method enables, in particular, a relatively high degree of synchronization interference immunity.

The synchronization signal is preferably in the form of a data request signal and is preferably used as such.

The data signal from the sensor preferably comprises one or more pulses.

The data signal from the sensor is preferably in the form of an injected current signal.

It is preferred for the electronic control unit to transmit at least one voltage-coded data signal to the sensor after a synchronization signal or between two synchronization signals, in particular in a third data transmission mode. In this case, the at least one synchronization signal is pulsed and the data signal likewise comprises one or more voltage pulses, particularly preferably of smaller amplitude than the synchronization signal, these voltage pulses of the data signal not having an alternating polarity. The electronic control unit uses such a voltage-coded data signal to transmit, for example, calibration data and/or status commands to the sensor. This voltage-coded data signal is expediently generated using the voltage modulator in the electronic control unit.

The data signal from the sensor preferably comprises status data and/or measurement data, in particular depending on the time of synchronization signal previously received by the sensor.

The sensor is preferably connected to the electronic control unit by exactly two lines, in particular by two electrical connecting lines.

Information is preferably transmitted between the electronic control unit and the sensor in a bidirectional manner, to be precise by data signal from the sensor to the electronic control unit (also abbreviated to ECU) and by synchronization signal from the ECU to the sensor. The electronic control unit preferably comprises a polarity reversal unit for generating or modulating the synchronization signal, the polarity reversal unit having, in particular, a changeover unit and a voltage modulator. The changeover unit has, in particular, four switches which are arranged or connected in such a manner that pairs of these switches can be used to change over the polarity of the supply voltage on the first and second lines, the changeover unit being particularly preferably in the form of an H-bridge or H-circuit.

It is preferred for the sensor to comprise a rectifier circuit, for example a bridge rectifier, and an energy store in order to guarantee its energy supply independently of the polarity of the supply voltage signal or the synchronization signal, the bridge rectifier being connected, in particular, to the first and second lines.

It is expedient for the sensor to have a polarization detector and a zero crossing detector which are designed and arranged in such a manner that they detect a polarization change and a zero crossing of the supply voltage signal or synchronization signal between the first and second lines, the polarization detector and the zero crossing detector being connected, in particular, to the rectifier circuit for this purpose. The sensor particularly preferably has a synchronization pulse shaper which is driven by the polarization detector and the zero crossing detector and drives a protocol decoder, the synchronization pulse shaper being designed in such a manner that it generates a synchronization pulse which causes the protocol decoder to generate a data signal comprising one or more data pulses in a defined manner and/or the transmission thereof to the ECU.

It is preferred for the sensor to have a mode changeover switch which is driven on the basis of the signal waveform of the synchronization signal, the signal waveform being detected at least by the polarization detector and the zero crossing detector, the mode changeover switch causing the sensor to transmit the information requested by the electronic control unit to the electronic control unit in a coded manner in the form of a data signal, the mode changeover switch driving the protocol decoder, in particular, for this purpose.

The electronic control unit is preferably designed in such a manner that the synchronization signal is generated in a defined manner, in particular with regard to its edge steepness, on the basis of the information or type of information to be requested by the electronic control unit, the ECU particularly preferably using the polarity reversal unit to generate a synchronization signal with ramp-shaped edges and transmitting said signal to the sensor so that the sensor sends back measurement data in a synchronous manner as the data signal, and/or the ECU uses the polarity reversal unit to transmit a steep-edged or square-wave synchronization signal to the sensor so that the sensor sends back status data in a synchronous manner as the data signal to the ECU.

The invention also relates to the use of the sensor arrangement in motor vehicles, the sensor being in the form of, in particular, a pressure sensor or an inertial sensor, particularly preferably in the form of an acceleration sensor and/or a structure-borne sound sensor.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
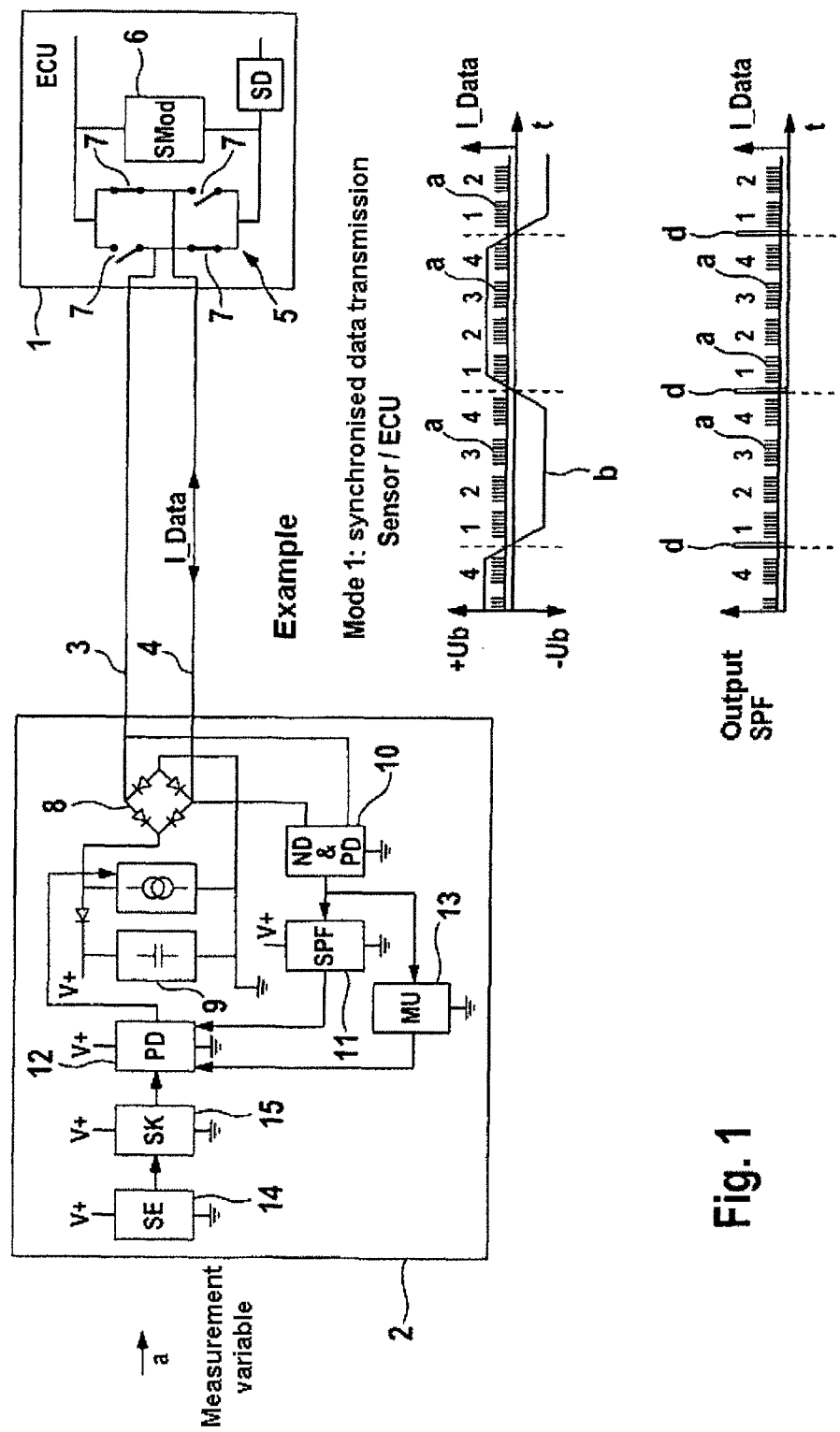
FIG. 1 schematically shows an exemplary sensor arrangement comprising a sensor, an ECU and two lines or connecting lines or supply lines between the sensor and the ECU, further subunits or components of the sensor and of the ECU being illustrated, and synchronized data transmission between the sensor and the ECU and mode determination by changing the polarity of the supply voltage being illustrated as a synchronization signal, FIGS. 2 to 4 schematically show different data transmission modes, each synchronized by means of a synchronization signal.
Figure 2:
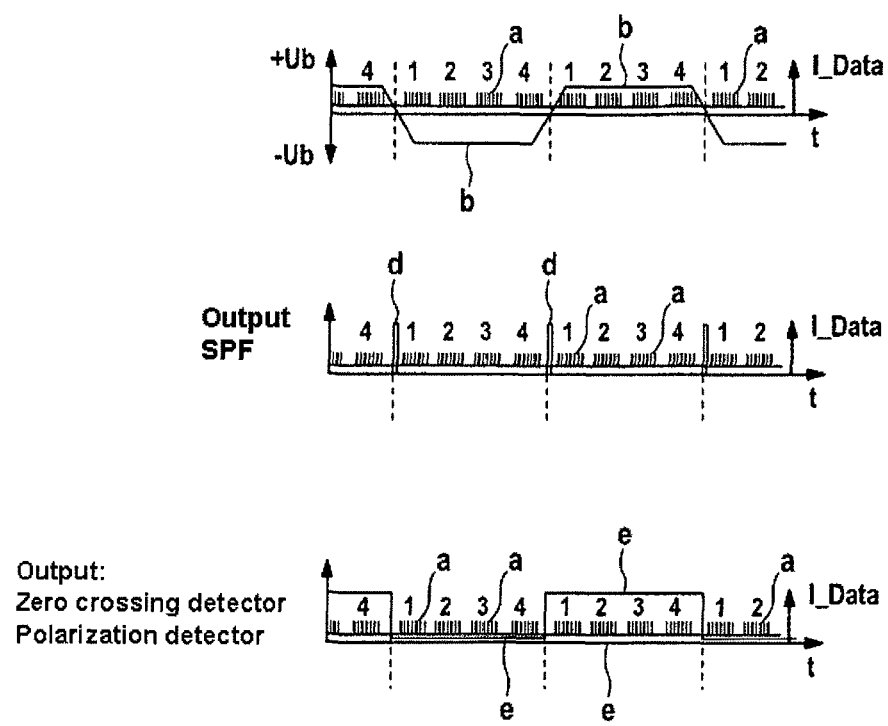
Figure 3:
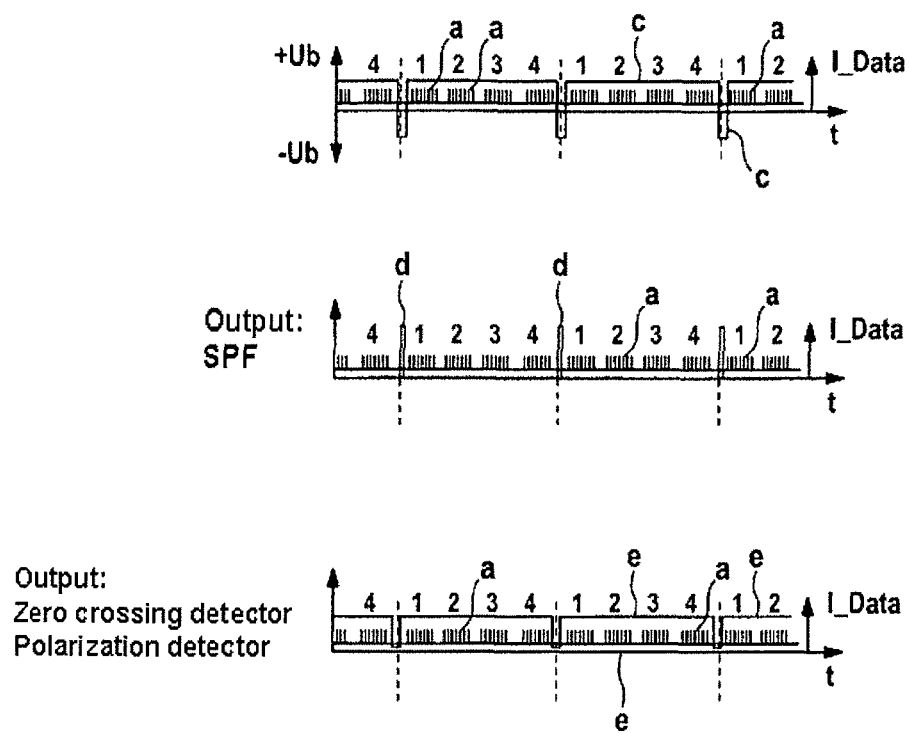

The method is described by way of example using the exemplary sensor arrangement illustrated in FIG. 1. The sensor arrangement comprises an electronic control unit ECU 1 and a sensor 2 which are connected to one another only by means of a first line 3 and a second line 4. The sensor 2 has a sensor element 14 and a signal processing circuit 15 which drives a protocol decoder 12 on the basis of the recorded measurement variable, for example an acceleration. The ECU requests information from the sensor 2 and generates, as a request and synchronization signal, in a polarity reversal unit, a defined supply voltage signal with alternating polarity which is transmitted to the sensor 2 via the first and second lines 3, 4. On the basis of the information or type of information to be requested by the electronic control unit 1, the synchronization signal b is generated by the voltage modulator 6 and the changeover unit 5 comprising four switches 7 which are arranged in such a manner that pairs of these switches 7 can be used to change over the polarity of the supply voltage b on the first and second lines 3, 4. In this case, the synchronization signals differ, according to the example, in terms of their edge steepness. A synchronization signal b with ramp-shaped edges is depicted in FIGS. 1 and 2 and is used as a data signal to request measurement data which are intended to be transmitted by the sensor to the ECU. In contrast, FIG. 3 shows a synchronization signal c of another type with steep edges, which signal is used as a data signal to request status data. Since the synchronization signal b, c in the form of a supply voltage signal has an alternating polarity for the purpose of synchronization, the sensor 2 comprises a bridge rectifier 8, connected to the first and second lines 3, 4, and an energy store 9 in order to guarantee its energy supply. In addition, the sensor has a polarization detector PD and a zero crossing detector ND, jointly assigned to the reference symbol 10, which detects the polarization changes or polarization and the zero crossing of the synchronization signal b. Respectively connected thereto, the sensor has a synchronization pulse shaper 11 and a mode changeover switch 13. The synchronization pulse shaper 11 is designed in such a manner that it generates a synchronization pulse d which causes the protocol decoder 12 to generate a data signal a comprising one or more data pulses in a defined manner. The mode changeover switch 13 which is driven on the basis of the signal waveform of the synchronization signal b, c, the signal waveform being detected at least by the polarization detector and the zero crossing detector 10, causes the sensor to transmit the information requested by the electronic control unit 1 to the electronic control unit 1 in a coded manner in the form of a data signal a, the mode changeover switch 13 driving the protocol decoder 12 for this purpose. The mode changeover switch 13 thus detects the operating mode and the information requested by the ECU, and the synchronization pulse shaper triggers the synchronous transmission of the sensor by means of its synchronization pulse d. The current-coded pulsed data signals a are detected by the current detector SD at the ECU end and are converted from digital current signals into digital voltage signals for further processing in the ECU.

According to the example, the following functional units from FIG. 1 perform the following functions:

Bridge rectifier: the bridge rectifier ensures that the sensor element and the internal signal processing are always supplied with the same voltage polarity, that is to say it protects the sensor electronics from polarity reversal.

Energy store: the energy store prevents the voltage supply for the sensor electronics being interrupted during the polarity reversal operation.

Zero crossing detector: it detects the zero crossing of the input voltage or the synchronization signal during the polarity reversal operation.

Synchronization pulse shaper: it generates a synchronization pulse when detecting the zero crossing from positive to negative or from negative to positive.

Polarization detector: it detects the polarity of the input voltage or the synchronization signal and forwards this to the mode changeover switch and to the synchronization pulse shaper.

Mode changeover switch: it determines the data transmission mode from the combination of the sync pulse sequence and the polarity. As examples, the following modes have currently been predefined: mode 1/sensor data output or measurement data as a data signal to the ECU, mode 2/reading status data as a data signal/configuration data/fault memory from the sensor to the ECU.

H-bridge: the H-bridge is used to change the polarity of the synchronization signal.

Current detector: the current detector converts the digital current signal transmitted by the sensor into digital voltage signals in the ECU.

Voltage modulator: the current modulator converts the data or data request signals to be sent to the sensor into the at least one synchronization signal and generates the synchronization signal in terms of its signal waveform, for example edge steepness.

FIG. 2 illustrates the synchronization signal b with ramp-shaped edges as a request and supply signal from the ECU, the output signal from the zero crossing detector and polarization detector e, the synchronization pulse d as the output signal from the synchronization pulse shaper and the data signals a comprising measurement data, corresponding to a first data transmission mode determined by the synchronization signal b.

FIG. 3 illustrates the synchronization signal c with steep or vertical edges as a request and supply signal from the ECU, the output signal from the zero crossing detector and polarization detector e, the synchronization pulse d as the output signal from the synchronization pulse shaper and the data signals a comprising status data, corresponding to a second data transmission mode determined by the synchronization signal c.

Figure 4:
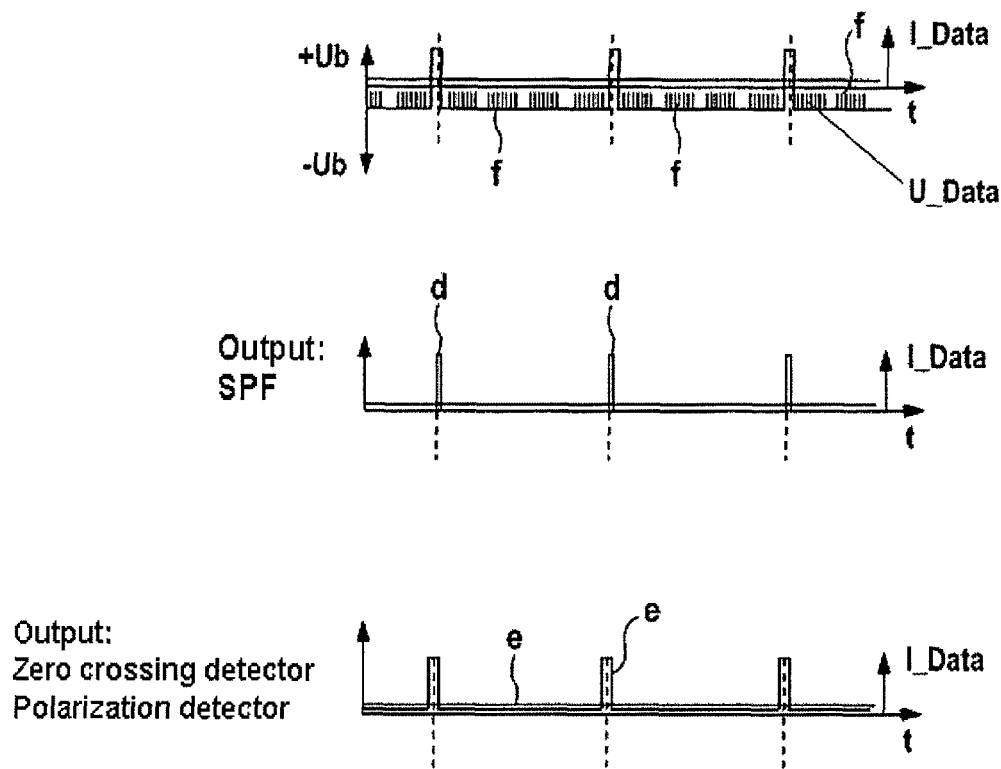

FIG. 4 illustrates the signals from FIGS. 2 and 3 for the third data transmission mode in which, however, the electronic control unit transmits at least one voltage-coded data signal f, U_Data to the sensor after a synchronization signal or between two synchronization signals. In this case, the synchronization signals are pulsed and, like the other synchronization signals, change the polarity of the voltage. The data signal f, U_Data likewise comprises one or more voltage pulses, particularly preferably of smaller amplitude than the synchronization signal, these voltage pulses of the data signal not having an alternating polarity. The electronic control unit uses such a voltage-coded data signal to transmit, for example, calibration data and/or status commands to the sensor. This voltage-coded data signal is expediently generated using the voltage modulator in the electronic control unit.

The invention claimed is:

1. A method for synchronizing sensors in a sensor arrangement comprising at least one electronic control unit and at least one sensor which are connected to one another via a first line and a second line, the method including:
    transmitting, by the electronic control unit, a defined supply voltage signal with alternating polarity as a synchronization signal (b, c) via the first and second lines to the sensor,
    determining, by a mode changeover switch, an operating mode of the sensor based on a sequence of pulses in the synchronization signal,
    determining, by the mode changeover switch, based on the operating mode, at least one data signal (a) for transmission to the electronic control unit, and
    transmitting, by the sensor, the at least one data signal (a) to the electronic control unit via the first and second lines, in response to the sensor detecting a polarity of the synchronization signal being changed.

2. The method as claimed in claim 1, wherein the data signal (a) from the sensor comprises one or more pulses.

3. The method as claimed in claim 1, wherein the data signal (a) from the sensor is in the form of an injected current signal.

4. The method as claimed in claim 1, wherein the electronic control unit transmits at least one voltage-coded data signal (f) to the sensor after receiving the synchronization signal.

5. The method as claimed in claim 1, wherein the sensor is connected to the electronic control unit by exactly two lines.

6. The method as claimed in claim 1, wherein the electronic control unit comprises a polarity reversal unit for generating or modulating the synchronization signal (b, c), the polarity reversal unit comprising a changeover unit having switches for connecting a voltage modulator to the first and second lines.

7. The method as claimed in claim 6, wherein the changeover unit has four switches which are arranged in such a manner that pairs of these switches can be used to change over the polarity of the supply voltage (b, c) on the first and second lines by connecting the voltage modulator to the first and second lines.

8. The method as claimed in claim 1, wherein the sensor comprises a bridge rectifier connected to the first and second lines and an energy store connected to the bridge rectifier in order to guarantee energy supplied to the sensor is independent of the polarity of the supply voltage signal (b, c).

9. The method as claimed in claim 1, wherein the sensor has a polarization detector and a zero crossing detector connected to at least one of the first and second lines, and which are designed and arranged in such a manner that they detect a polarization change and a zero crossing of the supply voltage signal (b, c) between the first and second lines.

10. The method as claimed in claim 9, wherein the sensor has a synchronization pulse shaper which is driven by the polarization detector and the zero crossing detector and drives a protocol decoder, the synchronization pulse shaper being designed in such a manner that it generates a synchronization pulse (d) which causes the protocol decoder to generate a data signal (a) comprising one or more data pulses in a defined manner.

11. The method as claimed in claim 9, wherein the sensor has a mode changeover switch which is driven on the basis of the signal waveform of the synchronization signal (b, c), the signal waveform being detected at least by the polarization detector and the zero crossing detector, the mode changeover switch causing the sensor to transmit the information requested by the electronic control unit to the electronic control unit in a coded manner in the form of a data signal (a), the mode changeover switch driving the protocol decoder for this purpose.

12. The method as claimed in claim 1, wherein the electronic control unit is designed in such a manner that the synchronization signal (b, c) is generated in a defined manner with regard to its edge steepness, on the basis of the information or type of information to be requested by the electronic control unit.

13. A sensor arrangement comprising:
at least one electronic control unit; and
at least one sensor connected to the electronic control unit via a first line and a second line,
wherein the electronic control unit is configured to transmit a defined supply voltage signal with alternating polarity to the sensor as a synchronization signal (b,c),
wherein a mode changeover switch determines an operating mode of the sensor based on a sequence of pulses in the synchronization signal,
wherein the mode changeover determines, based on the operating mode, at least one data signal (a) for transmission to the electronic control unit, and
wherein the sensor is configured to transmit the at least one data signal (a) to the electronic control unit via the first and second lines, in response to the sensor detecting a polarity of the synchronization signal being changed.

14. The use of the sensor arrangement as claimed in claim 13 in motor vehicles, the sensor being in the form of a pressure sensor or an inertial sensor.

* * * * *